(12) United States Patent
Seok et al.

(10) Patent No.: US 9,762,163 B2
(45) Date of Patent: Sep. 12, 2017

(54) METHOD FOR CONTROLLING AC MOTOR

(71) Applicant: Research Cooperation Foundation of Yeungnam University, Gyeongsangbuk-do (KR)

(72) Inventors: Jul Ki Seok, Daegu (KR); Se Hwan Kim, Daegu (KR)

(73) Assignee: Research Cooperation Foundation of Yeungnam University, Gyeongsan-si, Gyeongsangbuk-do (KR)

( * ) Notice: Subject to any disclaimer, the term of this patent is extended or adjusted under 35 U.S.C. 154(b) by 0 days.

(21) Appl. No.: 14/760,482

(22) PCT Filed: Nov. 26, 2013

(86) PCT No.: PCT/KR2013/010783
§ 371 (c)(1),
(2) Date: Jul. 13, 2015

(87) PCT Pub. No.: WO2014/181942
PCT Pub. Date: Nov. 13, 2014

(65) Prior Publication Data
US 2015/0357953 A1    Dec. 10, 2015

(30) Foreign Application Priority Data

May 8, 2013 (KR) ........................ 10-2013-0051990

(51) Int. Cl.
*H02P 21/00* (2016.01)
*B60L 15/02* (2006.01)
(Continued)

(52) U.S. Cl.
CPC ........ *H02P 21/0035* (2013.01); *B60L 15/025* (2013.01); *H02P 21/0021* (2013.01);
(Continued)

(58) Field of Classification Search
CPC ...... H02P 21/14; H02P 27/08; H02P 2207/05; B60L 15/025
See application file for complete search history.

(56) References Cited

U.S. PATENT DOCUMENTS 6,008,616 A * 12/1999 Nagayama .......... B60L 11/1803
                                                                        318/773
6,084,377 A *  7/2000 Seok ................. H02M 7/53873
                                                                        318/368

(Continued)

FOREIGN PATENT DOCUMENTS

JP       08-033399 A    2/1996
JP       09-047100 A    2/1997
(Continued)

OTHER PUBLICATIONS

International Search Report for PCT/KR2013/010783 mailed Dec. 23, 2013 from Korean Intellectual Property Office.

*Primary Examiner* — Shawki S Ismail
*Assistant Examiner* — Muhammad S Islam
(74) *Attorney, Agent, or Firm* — Revolution IP, PLLC

(57) ABSTRACT

Provides a method for controlling an AC motor, including: receiving a torque command value; generating a command current based on the torque command, and a command voltage by using the generated command current in a current vector controller (CVC) current control mode; switching to a hexagon voltage manipulating controller (HVMC) voltage control mode when the command voltage enters a voltage limit area, and generating a command voltage in the HVMC voltage control mode; and controlling torque of an AC motor by using the command voltage that is generated in the CVC current control mode or the HVMC voltage control mode.

6 Claims, 5 Drawing Sheets

(51) Int. Cl.
    *H02P 27/08*     (2006.01)
    *H02P 21/22*     (2016.01)
    *H02P 21/26*     (2016.01)
    *H02P 21/30*     (2016.01)
    *H02P 21/18*     (2016.01)

(52) U.S. Cl.
    CPC .............. *H02P 21/18* (2016.02); *H02P 21/22* (2016.02); *H02P 21/26* (2016.02); *H02P 21/30* (2016.02); *H02P 27/085* (2013.01); *B60L 2220/16* (2013.01); *H02P 2207/05* (2013.01); *Y02T 10/643* (2013.01)

(56) References Cited

U.S. PATENT DOCUMENTS

| | | | |
|---|---|---|---|
| 2007/0257626 A1 | 11/2007 | Lee et al. | |
| 2011/0031910 A1* | 2/2011 | Takahashi | H02P 21/0003 318/400.3 |
| 2012/0025749 A1* | 2/2012 | Lai | H02P 21/09 318/801 |

FOREIGN PATENT DOCUMENTS

| | | |
|---|---|---|
| JP | 2012-050173 A | 3/2012 |
| JP | 2012-130248 A | 7/2012 |
| KR | 2007-0107539 A | 11/2007 |

\* cited by examiner

[FIG. 1]
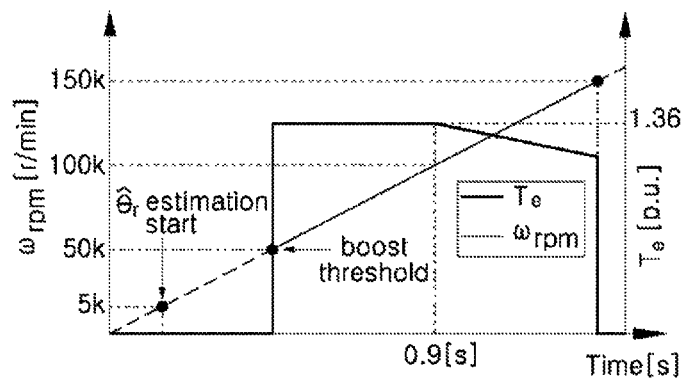
[FIG. 2]
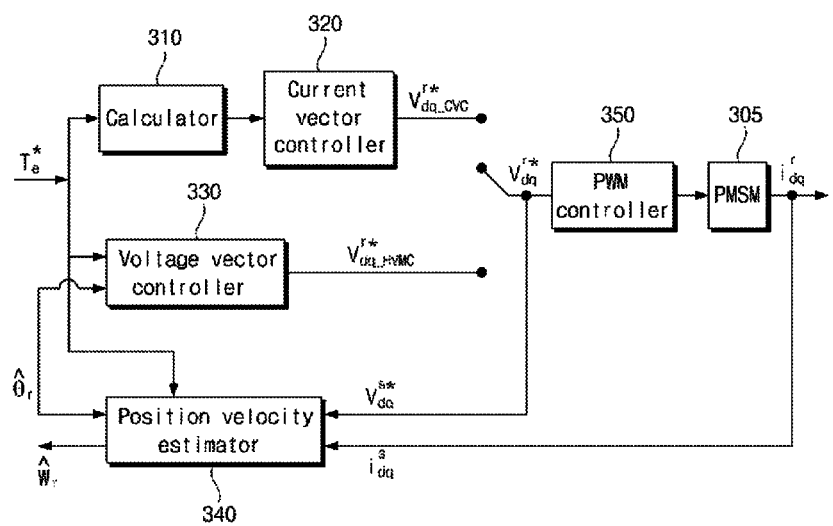

[FIG. 3]
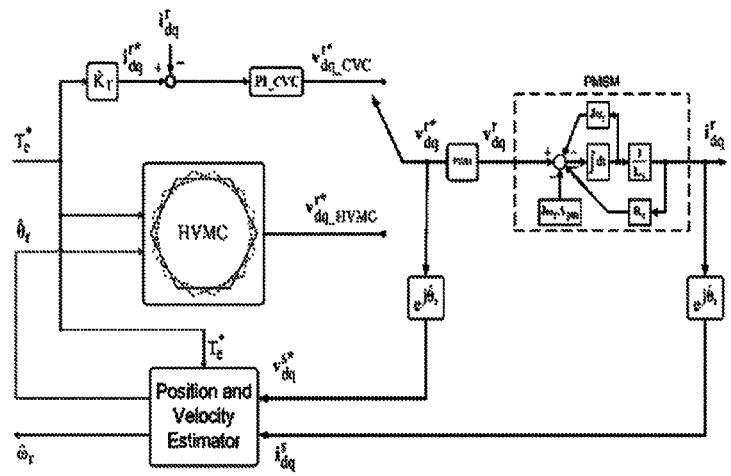
[FIG. 4]
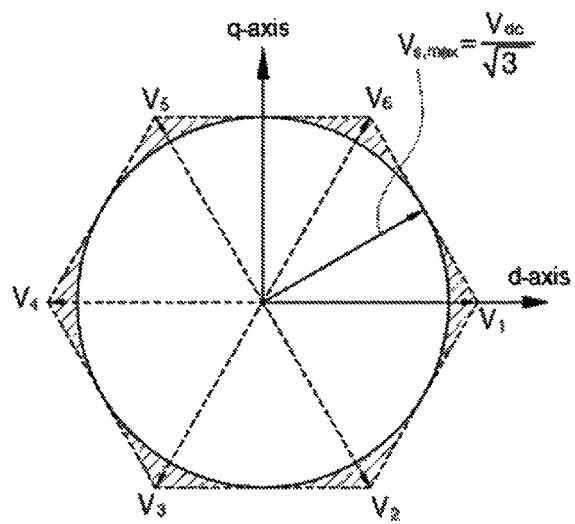

[FIG. 5]
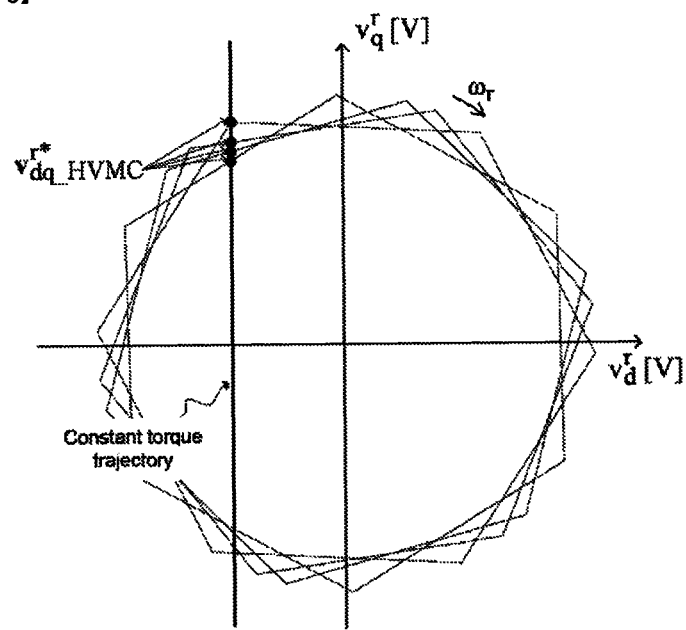

[FIG. 6]
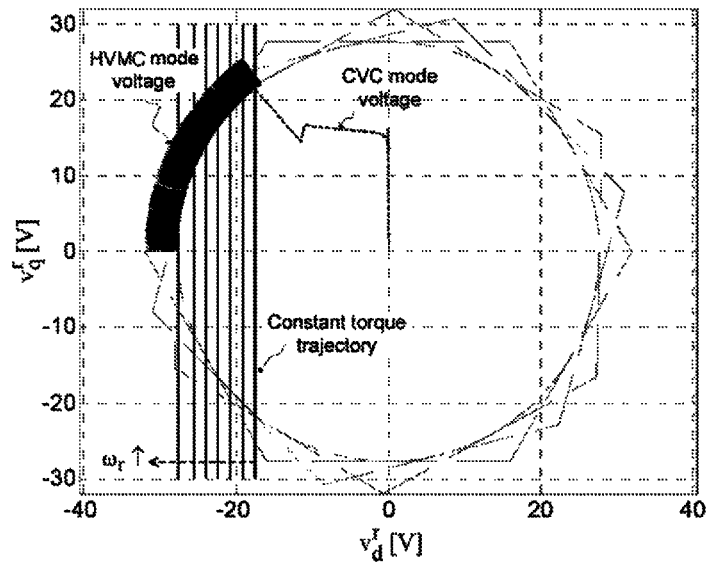
[FIG. 7]
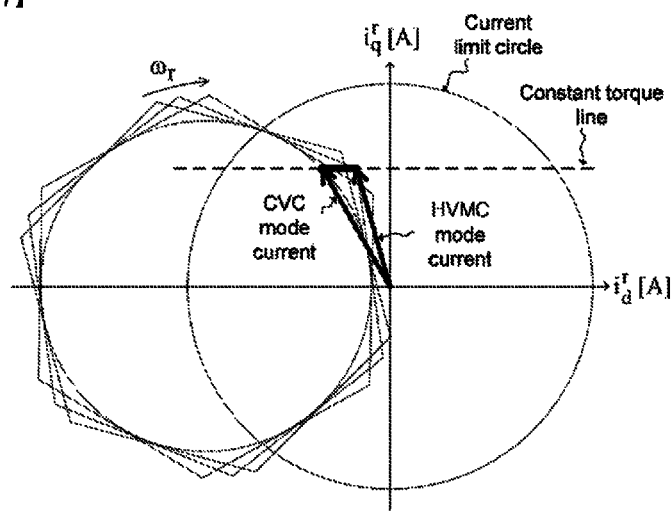

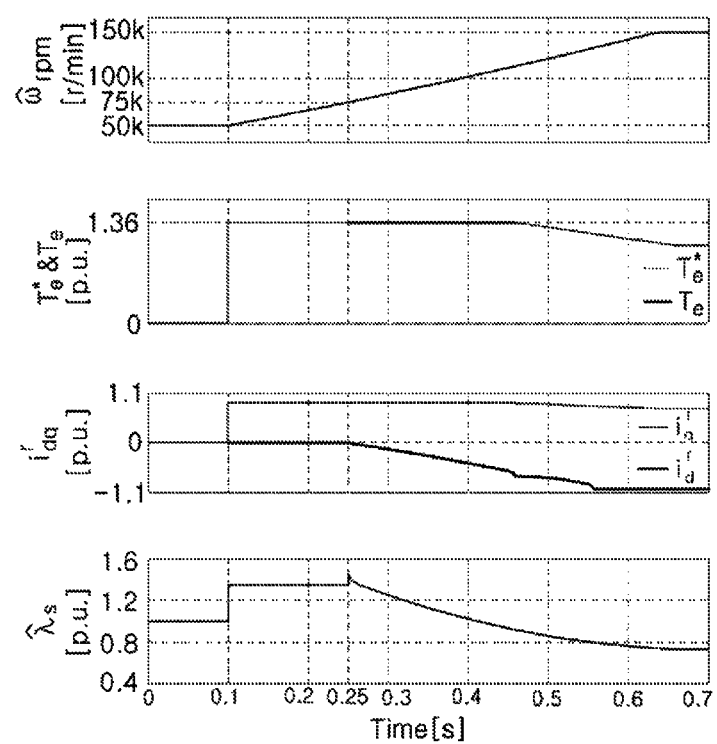
[FIG. 8]

METHOD FOR CONTROLLING AC MOTOR

CROSS REFERENCE TO PRIOR APPLICATIONS

This application is a National Stage Application of PCT International Patent Application No. PCT/KR2013/010783 filed on Nov. 26, 2013, under 35 U.S.C. §371, which claims priority to Korean Patent Application No. 10-2013-0051990 filed on May 8, 2013, which are all hereby incorporated by reference in their entirety.

BACKGROUND OF THE INVENTION (a) Field of the Invention

The present invention relates to a method for controlling an AC motor. More particularly, the present invention relates to a method for controlling an AC motor that is able to drive the AC motor stably and efficiently operating at voltage limit such as a high-speed operation and inverter dc-link voltage shortages.

(b) Description of the Related Art

Recently, according to the development of driving technology for a variable speed motor, the application of variable speed motors is increasing rapidly such as ultra-high-speed (>120,000 r/min), high efficiency, and high-power-density drives, such as electrically-assisted turbo chargers, turbo compressors, white goods applications, and reduced dc-link capacitor technology for heating-ventilating-air-conditioning (HVAC) systems. A driving system for the variable speed motor has high efficiency and low vibration. In addition, when the variable speed motor is driven at high-speed, plant productivity may be improved, and the variable speed motor may be driven in direct connection way without a separate increase speed gear, thereby reducing mechanical noise. Particularly, since an AC motor including a permanent magnet synchronous motor (PMSM) has excellent characteristics in efficiency, it is widely used in high-speed applications.

However, a speed sensor is required to perform a wide range of speed control for the variable speed AC motor, but the position sensor has structural reliability drawbacks and requires extra cost. In addition, a motor design process and a machining process are complicated due to the position sensor installment. Further, when the position sensor is installed, an axial direction length of the motor increases, such that a reduction in the size of an entire system may be difficult.

Accordingly, since the variable speed AC motor has such drawbacks, a position sensorless operation for the variable speed motor is required in the high-speed applications.

Further, since conventional current control methods therefor should be used only in linear voltage limits at high-speed, efficiency may be deteriorated, and a closed-loop current control may be unstable due to feedback sampling delay and limited sampling frequencies at elevated speeds for the closed-loop current control because the inverter switching frequency cannot be made sufficiently high, compared to the fundamental frequency.

A background technique of the present invention is disclosed in Korean Patent Laid-Open Publication No. 2007-0107539 (2007 Nov. 7).

The above information disclosed in this Background section is only to enhance the understanding of the background of the invention and therefore it may contain information that does not form the prior art that is already known in this country to a person of ordinary skill in the art.

SUMMARY OF THE INVENTION

The present invention has been made in an effort to provide a method for controlling an AC motor that is able to drive the AC motor stably and efficiently operating at voltage limit such as a high-speed operation and inverter dc-link voltage shortages.

An exemplary embodiment of the present invention provides a method for controlling an AC motor, including: receiving a torque command value; generating a command current based on the torque command, and a command voltage by using the generated command current in a current vector controller (CVC) current control mode; switching to a hexagon voltage manipulating controller (HVMC) voltage control mode when the command voltage encounters a voltage limit, and generating a command voltage in the HVMC voltage control mode; and controlling torque of an AC motor by using the command voltage that is generated in the CVC current control mode or the HVMC voltage control mode.

The method for controlling the AC motor may further include switching to the HVMC voltage control mode when a rotation speed of the AC motor increases or the dc-link voltage decreases such that the command voltage encounters a voltage limit.

The generating of the command voltage in the CVC current control mode may include calculating the current command value by dividing the torque command value by a predetermined torque constant; subtracting a fed back current value from a current value of the AC motor; and generating the command voltage based on the subtracted current value.

The CVC current control mode may be performed in the maximum torque per ampere (MTPA) region, and the HVMC voltage control mode is performed in a flux weakening (FW) and the maximum torque per voltage (MTPV) region.

The voltage limit area may correspond to a circular voltage limit in the synchronous d-q axes plane, the command voltage may include the voltage limit area as a voltage limit in the CVC current control mode, and the command voltage may include a voltage limit corresponding to a border line of a hexagonal voltage limit in the HVMC voltage control mode.

The method for controlling the AC motor may further include determining a voltage corresponding to a point at which a torque trajectory and the hexagonal space voltage vector cross to the command voltage in the HVMC voltage control mode.

Vectors ($v^*_{d\_HVMC}$, $v^*_{q\_HVMC}$) of the command voltage at a d-axis and a q-axis selected at the crossed point may be represented by the following equations.

$$v^{r*}_{d\_HVMC} = -\frac{4\omega_r L_s T^*_e}{3P\lambda_{pm}}$$

$$v^{r*}_{q\_HVMC} = -\frac{4M_n \omega_r L_s T^*_e}{3P\lambda_{pm}} + B_n,$$

Wherein $\omega_r$ represents the rotation speed of the AC motor, P represents the number of poles, $L_s$ represents a stator inductance, $\lambda_{pm}$ represents flux linkage of the AC motor, and $T_e^*$ represents the torque command value.

The method for controlling the AC motor may further include estimating a position of the AC motor by using the torque command value, the current of the AC motor, and the command voltage generated in the CVC current control mode or the HVMC voltage control mode.

The AC motor may be a non-salient permanent magnet synchronous motor (PMSM), and the constant torque trajectory may be formed to have a straight line in this type of the motor.

According to the exemplary embodiment of the present invention, it is possible to stably and efficiently control an AC motor by using a current control method in a non-limited voltage condition or a low speed region and a voltage control method through an entire voltage limit in a voltage limit condition or a high speed region.

In addition, since the exemplary embodiment of the present invention uses a maximum voltage in a hexagon voltage manipulating controller (HVMC) voltage control mode, it may generate the output torque further greater than the case of using only a current vector controller (CVC) current control method in a weak magnetic flux range, and thus a CVC operation range may be reduced maximally while improving efficiency. Further, according to the exemplary embodiment of the present invention, it is possible to prevent a current distortion caused by a CVC current control operation at super-high-speed while performing a sensorless operation at low-speed.

BRIEF DESCRIPTION OF THE DRAWINGS

FIG. 1 is a graphical illustrating rotation speed changes and torque changes of a non-salient permanent magnet synchronous motor (PMSM) in an electrically assisted turbo charger (EATC) system according to an exemplary embodiment of the present invention.

FIG. 2 is a schematic diagram of a permanent magnet synchronous motor controller according to an exemplary embodiment of the present invention.

FIG. 3 is a schematic diagram for explaining a control method by a permanent magnet synchronous motor controller according to an exemplary embodiment of the present invention.

FIG. 4 is a schematic diagram for explaining a hexagonal boundary of inverter available voltage.

FIGS. 5 and 6 are schematic diagrams for explaining processes obtaining a stator voltage in a HVMC voltage control mode.

FIG. 7 is a schematic diagram illustrating a vector trace of a stator current according to a torque command value on a d-q current plane.

FIG. 8 consists of graphs illustrating experimental results obtained by a permanent magnet synchronous motor control method according to an exemplary embodiment of the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

As the present invention relates to a method for controlling an AC motor, the AC motor according to an exemplary embodiment of the present invention, which is able to be driven at high-speed, may be applied to an electrically assisted turbo charger (EATC) system. The turbo charger includes a turbine and a compressor connected by a common shaft provided in a bearing system, and it changes energy through air compressed by exhaust gas of an engine.

The AC motor according to the exemplary embodiment of the present invention includes a stator and a rotor, and may correspond to various kinds of AC motors driven by AC power. For convenience of illustration, a permanent magnet synchronous motor (PMSM), which is an AC motor, will now be described.

The permanent magnet synchronous motor (PMSM) uses a permanent magnet, and it serves so that the turbo charger may operate at further higher speed than the case of using the exhaust gas. Accordingly, the EATC system may generate more energy, and combustion processes may be efficiently improved. Further, the EATC system generates a boost only when there is a predetermined amount of kinetic energy in exhaust gas.

FIG. 1 is a graphical illustrating rotation speed changes and torque changes of a non-salient permanent magnet synchronous motor (PMSM) in an electrically assisted turbo charger (EATC) system according to an exemplary embodiment of the present invention.

As experimental results illustrated in FIG. 1, although a sensorless position control is required from a rotation speed ($\omega_{rpm}$) of about 5,000 r/min of the PMSM, a boost threshold starts at about 50,000 r/min. Further, while the PMSM is accelerating from a rotation speed ($\omega_{rpm}$) of about 50,000 r/min to about 100,000 r/min, it transmits a value corresponding to about 136% of a measured torque, and a torque value ($T_e$) gradually decreases at the time of about 0.9 seconds. That is, according to FIG. 1, even though the rotation speed ($\omega_{rpm}$) of the PMSM increases, the torque value ($T_e$) is not constantly maintained, and the rotation speed gradually decreases from a predetermined speed over to enter a range of a weak magnetic flux.

An operation of a permanent magnet synchronous motor controller according to an exemplary embodiment of the present invention will be now described with reference to FIGS. 2 to 8.

FIG. 2 is a schematic diagram of a permanent magnet synchronous motor controller according to an exemplary embodiment of the present invention, and FIG. 3 is a schematic diagram for explaining a control method by a permanent magnet synchronous motor controller according to an exemplary embodiment of the present invention. FIG. 4 is a schematic diagram for explaining a hexagonal boundary of inverter available voltage.

A permanent magnet synchronous motor controller according to FIG. 2, which transmits a command voltage ($V_{dq}^{r*}$) of a final magnetic flux axis (d-axis) and a torque axis (q-axis) to a PMSM 305, includes a calculator 310, a current vector controller 320, a voltage vector controller 330, a position velocity estimator 340, and a PWM controller 350.

The PMSM 305, which is a synchronous motor using a permanent magnet, has excellent high-speed endurance and high-speed driveability, thereby having suitable characteristics for use in an industrial motor and a motor for a hybrid electric vehicle. In the PMSM 305, inductance thereof is symmetrically formed, unlike an interior PMSM (IPMSM).

The PMSM includes a stator and a rotor, and in FIG. 3, $v^r_{dq}$ and $i^r_{dq}$ respectively represent a voltage vector and a current vector of the stator in a basic frame of the rotor. $R_s$ represents a stator resistance, $\theta_r$ represents a rotation angle of the rotor, $\omega_r$ represents an angular velocity, and $K_T$ represents a torque constant. Further, J represents a matrix, $$\begin{bmatrix} 0 & -1 \\ 1 & 0 \end{bmatrix}.$$

Further, $L_s$ represents a stator inductance, $\lambda_{pm}$ represents a permanent magnet (PM) flux linkage, and they are used as in Equation 1.

$$L_s = \begin{bmatrix} L_s & 0 \\ 0 & L_s \end{bmatrix} \text{ and } \Lambda_{pm} = \begin{bmatrix} \lambda_{pm} \\ 0 \end{bmatrix} \quad \text{(Equation 1)}$$

The stator voltage of the PMSM is proportional to the sum of the permanent magnet flux linkage ($\lambda_{pm}$) and the stator inductance ($L_s$), and when the permanent magnet flux linkage ($\lambda_{pm}$) or the stator inductance ($L_a$) increases, the boost threshold shown in FIG. 2 may be decreased. The exemplary embodiment of the present invention may increase the permanent magnet flux linkage ($\lambda_{pm}$), thereby increasing the rotation speed of the PMSM. As such, since the boost threshold may be decreased by increasing the permanent magnet flux linkage ($\lambda_{pm}$), it is possible to perform a position sensorless control for the PMSM even at low-speed.

A permanent magnet synchronous motor (PMSM) control method according to an exemplary embodiment of the present invention will now be described with reference to FIGS. 2 and 3. According to the exemplary embodiment of the present invention, when a rotation speed of the PMSM is low, the current vector controller 320 controls the PMSM in a current vector control (CVC) mode, and when a rotation speed of the PMSM is high, the voltage vector controller 330 controls the PMSM in a hexagon voltage manipulating controller (HVMC)-based voltage control mode. That is, the current vector controller 320 controls or operates the PMSM in the CVC current control mode in a positive low-speed torque region in which the torque ($T_e$) of the PMSM is constantly maintained, and the voltage vector controller 330 controls or operates the PMSM in the HVMC voltage control mode in a high-speed flux weakening region in which the torque ($T_e$) of the PMSM decreases.

First, when a torque command value ($T_e^*$) is inputted, the calculator 310 divides the inputted torque command value ($T_e^*$) by the torque constant ($K_T$) to calculate a command current vector ($i^{r*}_{dq}$). Next, the calculator 310 subtracts a current value ($i^r_{dq}$) that is fed back from the rotor of the PMSM from the calculated command current vector ($i^{r*}_{dq}$).

The current vector controller 320 consisting of a proportional-integral (PI) current vector controller (PI_CVC) outputs a command voltage vector ($v^{r*}_{dq\_CVC}$) based on a difference between the command current vector ($i^{r*}_{dq}$) and the fed back synchronous coordinate system stator current ($i^r_{dq}$). As such, in the low-speed CVC current control mode, the fed back synchronous coordinate system stator current ($i^r_{dq}$) is controlled by the current vector controller 320 in order to follow the command current vector ($i^{r*}_{dq}$), and the command voltage vector ($v^{r*}_{dq\_CVC}$) based on the current control is transmitted to the PMSM 305 within a voltage limit.

Here, the PWM controller 350 switches and controls operation of the PMSM 305 in a PWM according to the outputted command voltage ($v^{r*}_{dq}$).

The position velocity estimator 340 estimates a position and a rotation speed of the PMSM in an area corresponding to a sensorless position. That is, as shown in FIG. 3, when the torque command value ($T_e^*$), the command voltage vector ($v^{s*}_{dq}$) of the command voltage vector ($v^{r*}_{dq}$) being transformed in a coordinate, and the command current vector ($i^s_{dq}$) of the stator current vector ($i^r_{dq}$) being transformed in a coordinate are inputted to the position velocity estimator 340, the position velocity estimator 340 estimates an angular speed ($\hat{\omega}_r$) and a rotation angle ($\hat{\theta}_r$) of the rotor to compensate a torque error.

In addition, the command voltage vector ($v^*_{dq\_CVC}$), as shown in FIG. 4, always has a linear voltage corresponding to within a radius of $$\frac{V_{dc}}{\sqrt{3}},$$

wherein $V_{dc}$ represents a dc-link voltage.

Referring to FIG. 4, references $V_1$ to $V_6$ represent vector-summed voltages of a d-axis applied voltage ($v^{r*}_{ds}$) and a q-axis applied voltage ($v^{r*}_{qs}$), a circle inscribed in the hexagonal area is an area in which linear voltage synthesis is possible, and $$\frac{V_{dc}}{\sqrt{3}}$$

represents a maximum synthesis voltage that may be linearly synthesized in the area of the circle. The hexagonal area indicates a voltage synthesis area in which a space vector pulse width modulation (PWM) method may be performed, and a hatched area excluding the circle inscribed in the hexagonal area indicates a non-linear voltage modulation area.

When the rotor of the PMSM rotates at high-speed, the stator voltage ($V^r_{ds}$) may be represented by Equation 2.

$$v^r_{ds} \cong -\omega_r L_s i_{qs}^r \quad \text{(Equation 2)}$$

The torque ($T_e$) of the PMSM may be represented by Equation 3.

$$T_e = \frac{3}{2}\frac{P}{2}\lambda_{pm} i_{qs}^r = \frac{3}{2}\frac{P}{2}\lambda_{pm}\left(-\frac{v^r_{ds}}{\omega_r L_s}\right) \quad \text{(Equation 3)}$$

Here, P is the number of poles.

As the rotation speed ($\omega_r$) of the PMSM increases, the command voltage vector ($v^*_{dq\_CVC}$) by the current control approaches a linear voltage limit boundary. Further, as shown in Equation 3, as the rotation speed ($\omega_r$) of the PMSM increases, the torque value ($T_e$) decreases.

Therefore, according to the exemplary embodiment of the present invention, although the rotation speed ($\omega_r$) of the PMSM increases, the voltage vector controller 330 controls or operates the PMSM in the HVMC voltage control mode in the flux weakening region in order to prevent the torque value ($T_e$) from being decreased. The HVMC voltage control mode is a mode for using all the hexagonal area shown in FIG. 4, and the hexagonal boundary lines shown in FIG. 4 represent limit voltages for using a maximum voltage in a wide driving area so that efficiency may be improved.

FIGS. 5 and 6 are schematic diagrams for explaining processes obtaining a stator voltage in the HVMC voltage control mode. FIG. 5 is a schematic diagram for explaining a process of obtaining a stator voltage ($v^r_q$, $v^r_d$) between a constant torque trajectory and a rotating hexagon at a synchronous d-q voltage plane. According to the exemplary embodiment of the present invention, a point where the constant torque trajectory and the rotating hexagonal cross becomes the command voltage vector ($v^*_{dq\_HVMC}$) in the HVMC voltage control mode.

Here, the constant torque trajectory is parallel to the q-axis, and has a straight-line shape. When other motors including the interior PMSM (IPMSM) is used instead of the PMSM, the constant torque trajectory may be formed to have a curved line shape.

The d-q axis command voltage vectors ($v^*_{dq\_HVMC}$) that are selected at the cross point are respectively represented by Equation 4 and Equation 5.

$$v^{r*}_{d\_HVMC} = -\frac{4\omega_r L_s T^*_e}{3P\lambda_{pm}} \quad \text{(Equation 4)}$$

$$v^{r*}_{q\_HVMC} = -\frac{4M_n \omega_r L_s T^*_e}{3P\lambda_{pm}} + B_n \quad \text{(Equation 5)}$$

Here, $M_n$ and $B_n$ represent constant values given by the boundary of each hexagon sector.

The HVMC voltage control mode according to the exemplary embodiment of the present invention, as shown in FIG. 5, obtains a voltage currently satisfied with respect to the inputted torque command ($T_e$*) in the rotating hexagon, and since the hexagon rotates, the cross point has a shape to be vibrated on the command constant torque trajectory.

According to the exemplary embodiment of the present invention, the torque value is controlled around the predetermined constant torque trajectory depending on selection of the command voltage vectors ($v^*_{dq\_HVMC}$) (which is shown in points in FIG. 5).

As the rotation speed ($\omega_r$) of the PMSM increases, the command constant torque trajectory shown in FIG. 5 moves in a negative direction, various command torques, and when the cross points between the rotating hexagons are shown in time series, they are represented as in FIG. 6.

As such, according to the exemplary embodiment of the present invention, as the rotation speed ($\omega_r$) of the PMSM increases, the operation mode for the PMSM is switched to the HVMC voltage control mode in the flux weakening region so that a voltage utilization rate may be improved in the flux weakening region. Accordingly, after the command voltage vector ($v^*_{dq\_CVC}$) is extended to the outside of the circle inscribed in the hexagon, it is controlled in a hexagonal voltage limit value using a minimum-distance error over-modulation to be outputted as the command voltage vector ($v^*_{dq\_HVMC}$), thereby using the maximum voltage in the flux weakening region.

That is, according to the exemplary embodiment of the present invention, as the rotation speed of the PMSM increases, when the command voltage enters the voltage limit area (the outside area of the circle inscribed in the hexagon), the CVC current control mode is switched to the HVMC voltage control mode. Further, although the rotation speed of the PMSM is low, even when a voltage limit occurs due to the lack of available voltage, the operation mode of the PMSM may be switched to the HVMC voltage control mode.

The process switched to the HVMC voltage control mode in the flux weakening region with increasing of the rotor speed will now be described in detail. As can be known from Equation 3, when the rotation speed ($\omega_r$) of the PMSM) increases, the torque value ($T_e$) moves in the negative d-axis direction.

Thus, the d-axis voltage component ($v^r_d$) selected according to the increase of the rotation speed increases in the negative direction, while the q-axis voltage component ($v^r_q$) decreases. Therefore, according to the exemplary embodiment of the present invention, an automatic flux weakening operation and the maximum voltage utilization may be implemented without an extra control gain, additional FW controllers, and observers for closed-loop control.

FIG. 7 is a schematic diagram illustrating a vector trace of a stator current according to a torque command value on a d-q current plane. While the mode is switched, the current vector of the stator moves along a constant torque line in the CVC current control mode. A magnitude of the current vector decreases in the HVMC voltage control mode, and this is because the maximum voltage is used in the HVMC voltage control mode.

Accordingly, according to the exemplary embodiment of the present invention, when the HVMC voltage control mode is used in the flux weakening region, a motor torque per Ampere increases greater than the case using only the CVC current control mode.

Such a characteristic causes the permanent magnet (PM) flux linkage ($\lambda_{pm}$) of the PMSM) to increase, thereby performing the position sensorless operation even at low-speed. Further, a problem caused by an abnormal current change at super-high-speed may be solved by reducing a reference speed. As such, it is possible to improve efficiency of an inverter through a low PWM switching frequency by limiting an area of the CVC current control mode.

FIG. 8 consists of graphs illustrating experimental results obtained by the PMSM control method according to the exemplary embodiment of the present invention, and the graphs respectively illustrate an estimated rotor speed ($\omega_{rpm}$), a torque command ($T_e$*) and an actual PMSM torque ($T_e$), a stator current ($i^r_{dq}$), and an estimated stator flux linkage ($\lambda_s$).

In the present experimental example, when the speed of the rotor is 75,000 r/min (t=0.25 seconds), the CVC current mode is set to be switched to the HVMC voltage mode, and the DC-link voltage is set to be abbot 48 volts.

As illustrated in the experimental example of FIG. 8, according to the exemplary embodiment of the present invention, when the speed ($\omega_{rpm}$) of the rotor increases, the torque ($T_e$) of the PMSM, as shown in FIG. 1, does not decrease, and it satisfies and follow the torque command ($T_e$*) even after the switched time (0.25 seconds) by switching the CVC current mode into the HVMC voltage mode.

As such, according to the exemplary embodiment of the present invention, since the current control mode is not performed in the flux weakening region, the CVC current control mode is smoothly switched to the HVMC voltage control mode, and while the CVC current control mode is switched to the HVMC mode, distortion of the air-gap torque does not occur.

Further, as the PM flux linkage ($\lambda_m$) increases, the boost threshold decreases, and thus when the rotation speed becomes equal to or greater than about 50,000 r/min (t=0.1 seconds), the position sensorless control for the PMSM can be performed, and after the rotation speed becomes equal to or greater than about 50,000 r/min, the position of the rotor may be estimated through the position velocity estimator 340 in a stationary reference frame.

According to the exemplary embodiment of the present invention, the rotation speed of about 120,000 r/min is achieved in the flux weakening region despite the increase of the PM flux linkage ($\lambda_s$). That is, according to the exemplary embodiment of the present invention, due to being switched to the HVMC voltage mode at high-speed, it is possible to prevent the torque from decreasing before the rotation speed ($\omega_{rpm}$) of the PMSM is about 120,000 r/min.

As illustrated in such experimental results, according to the exemplary embodiment of the present invention, unlike FIG. 1, even though the rotation speed ($\omega_{rpm}$) of the PMSM continues to increase, the torque value ($T_e$) may be maintained before entering flux weakening region.

Further, as illustrated in the experimental results of FIG. 6, according to the exemplary embodiment of the present invention, the rotation speed ($\omega_r$) of the PMSM may increase from about 50,000 r/min to about 150,000 r/min in about 0.55 seconds (0.1-0.65 seconds), thereby improving acceleration thereof compared with a conventional art.

As described above, the PMSM controller according to the exemplary embodiment of the present invention, which is provided in the EATC system combined to an automatic engine plant, may smoothly switch the CVC current control mode to the HVMC voltage control mode by not performing the current control mode in the flux weakening region.

Further, according to the exemplary embodiment of the present invention, since the maximum voltage is used in the HVMC voltage control mode, a motor torque much larger than the case using only the CVC current control method in the flux weakening region may be obtained, thereby reducing the CVC operation area as much as possible and improving efficiency.

According to the exemplary embodiment of the present invention, it is possible to prevent current distortion caused by CVC current control operation at super-high-speed and to perform position sensorless operation at low-speed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling an AC motor, comprising:
receiving a torque value of the AC motor;
in response to receipt of the torque value, generating a command current according to the torque value, and generating a command voltage by using the generated command current in a current vector controller (CVC) current control mode;
in response to detection of the command voltage reaching to a voltage limit area which being a voltage limit in the CVC current control mode, switching to voltage control mode by a hexagon voltage manipulating controller (HVMC), and generating a command voltage in the HVMC voltage control mode;
controlling the torque value by using at least one of the command voltage generated in the CVC current control mode and the command voltage in the HVMC voltage control mode, wherein
the voltage limit area corresponds to a circular voltage limit in a synchronous d-q axes plane, and
the command voltage includes a voltage limit corresponding to a border line of a hexagonal voltage limit in the HVMC voltage control mode; and
determining a voltage corresponding to a point at which a constant torque trajectory and the hexagonal space voltage vector cross to the command voltage in the HVMC voltage control mode, wherein
vectors ($v^*_{d\_HVMC}$, $v^*_{q\_HVMC}$) of the command voltage at a d-axis and a q-axis selected at the crossed point are represented by the following equations:

$$v^{r*}_{d\_HVMC} = -\frac{4\omega_r L_s T_e^*}{3P\lambda_{pm}}$$

$$v^{r*}_{q\_HVMC} = -\frac{4M_n \omega_r L_s T_e^*}{3P\lambda_{pm}} + B_n$$

wherein $\omega_r$ represents a rotation speed of the AC motor, P represents a number of poles, Ls represents a stator inductance, $\lambda$.pm represents flux linkage of the AC motor, and $T_e^*$ represents a torque command value.

2. The method for controlling the AC motor of claim 1, further comprising:
in response to detection of a rotation speed of the AC motor increases such that the command voltage in the HVMC voltage control mode reaching to the threshold voltage limit, switching to the HVMC voltage control mode.

3. The method for controlling the AC motor of claim 1, wherein
the generating the command voltage in the CVC current control mode includes
calculating a value of the command current by dividing the torque value by a predetermined torque constant;
subtracting a feedback current value generated from the AC motor; and
generating the command voltage in the CVC current control mode using the subtracted feedback current value.

4. The method for controlling the AC motor of claim 1, wherein
the CVC current control mode is performed in a maximum torque per ampere (MTPA) region, and the HVMC voltage control mode is performed in a flux weakening (FW) and a maximum torque per voltage (MTPV) region.

5. The method for controlling the AC motor of claim 1, further comprising:
estimating a position of the AC motor by using a torque command value, a current of the AC motor, and the command voltage generated at least one of in the CVC current control mode and the HVMC voltage control mode.

6. The method for controlling the AC motor of claim 1, wherein
the AC motor is a permanent magnet synchronous motor (PMSM), and the constant torque trajectory is formed to have a straight line.

* * * * *